(12) United States Patent
Perdrigeon et al.

(10) Patent No.: US 9,429,031 B2
(45) Date of Patent: Aug. 30, 2016

(54) HUB FOR RADIAL HOUSING OF A HELICAL RING OF A TURBOMACHINE WITH VARIABLE-PITCH BLADES AND ASSEMBLY COMPRISING SUCH A HUB

(71) Applicant: SNECMA, Paris (FR)

(72) Inventors: Christophe Perdrigeon, Ballainvilliers (FR); Laurent Jablonski, Melun (FR); Philippe Gerard Edmond Joly, Vaux le Penil (FR)

(73) Assignee: SNECMA, Paris (FR)

( * ) Notice: Subject to any disclaimer, the term of this patent is extended or adjusted under 35 U.S.C. 154(b) by 468 days.

(21) Appl. No.: 13/933,538

(22) Filed: Jul. 2, 2013

(65) Prior Publication Data

US 2014/0003945 A1     Jan. 2, 2014

(30) Foreign Application Priority Data

Jul. 2, 2012   (FR) ...................................... 12 56323

(51) Int. Cl.
*F01D 7/00*       (2006.01)
*F01D 5/30*       (2006.01)
(Continued)

(52) U.S. Cl.
CPC ............... *F01D 7/00* (2013.01); *F01D 5/3023* (2013.01); *F02C 3/067* (2013.01); *F02C 6/206* (2013.01); *F05D 2220/324* (2013.01); *F05D 2220/325* (2013.01); *F05D 2260/33* (2013.01); *F05D 2260/79* (2013.01)

(58) Field of Classification Search
CPC ........ F01D 7/00; F01D 5/3023; F01D 25/16; F01D 25/162; F02C 3/067; F02C 7/06; F05D 2220/324; F05D 2220/325; F05D 2260/331; F05D 2260/79; F16C 35/04
USPC ....... 415/66, 68–69; 416/244 R, 244 A, 174, 416/128–130, 147, 204 A, 205, 124, 126
See application file for complete search history.

(56) References Cited

U.S. PATENT DOCUMENTS 4,630,999 A      12/1986  De La Harpe
5,263,898 A *   11/1993  Elston, III .............. B64C 11/06
                                                                416/129

(Continued)

FOREIGN PATENT DOCUMENTS

EP    0 137 873 A1    4/1985
FR    2 641 324 A1    7/1990
(Continued)

OTHER PUBLICATIONS

Search Report issued Mar. 19, 2013 in French FR 1256323 FA770376 (with English translation of category of documents).

*Primary Examiner* — Christopher Verdier
(74) *Attorney, Agent, or Firm* — Oblon, McClelland, Maier & Neustadt, L.L.P.

(57) ABSTRACT

A helical ring including a polygonal body and a plurality of cylindrical radial housings arranged in the body is provided. Each housing includes a surface adapted to receive a support of a blade of a helix. The surface of each housing is arranged on a radially internal surface of a corresponding hub. Each hub is a separate piece attached to the body of the ring, intended to be received in a radial housing of the body of the ring. The hub includes two projecting pins relative to its external surface to be fastened to the edges of a housing of the annular body, the two projecting pins forming a centering axis.

6 Claims, 8 Drawing Sheets

(51) Int. Cl.
*F02C 3/067* (2006.01)
*F02C 6/20* (2006.01)

(56) References Cited

U.S. PATENT DOCUMENTS

2009/0087127 A1* 4/2009 Larsen .................. F03D 7/0224
384/129

2010/0239421 A1* 9/2010 Boston .................... B64C 11/06
416/136
2011/0176924 A1 7/2011 Gallet et al.

FOREIGN PATENT DOCUMENTS

| GB | 676589 | 7/1952 |
| GB | 2474561 A | 4/2011 |
| WO | WO 2011/124832 A1 | 10/2011 |

* cited by examiner

HUB FOR RADIAL HOUSING OF A HELICAL RING OF A TURBOMACHINE WITH VARIABLE-PITCH BLADES AND ASSEMBLY COMPRISING SUCH A HUB

FIELD OF THE INVENTION

The present invention relates to the field of helical rings of a turbomachine with variable-pitch blades.

It can be applied especially advantageously in the case of open-rotor helix (or "unducted fan").

PRIOR ART

FIG. 1 illustrates a turbomachine 1 of the open-rotor helix type. From upstream to downstream, in the direction of flow of air flow as shown by arrows F, it comprises a compressor 2, an annular combustion chamber 3, a high-pressure turbine 6, and two low-pressure turbines 8 which are counter-rotating.

Each low-pressure turbine 8 is connected to an external helix 9, both helices being arranged coaxially behind each other, around the longitudinal axis A of the turbomachine 1 and each comprising a plurality of blades P distributed uniformly around said axis.

For this purpose, each conventionally comprises (FIG. 2) an annular rotor body 10, generally polygonal, which is centred on the longitudinal axis of the turbomachine, and which has a specific number of radial cylindrical housings 11 distributed uniformly around the axis of the resulting ring, these housings 11 being provided to receive the blades of the helix.

Each housing 11 in turn receives a crown 12 (FIG. 3) to which is fixed the body 13a of a plate 13 which in turn bears the foot 14 of a blade P. This crown 12 is mounted rotatingly in the housing 11 which receives it, for adjusting the angular orientation of the blade P.

For this to occur, the internal surface of a housing 11 is machined and adjusted to constitute a hub which receives the crown 12 and the bearing rings 15 of different bearings interposed between the internal surface of said housing and said crown 12.

Different connecting threads are also machined into said housing especially for fastening a lid 16 intended to close the housing once the crown is in place, or again for connecting a tightening nut.

These machining operations are complex. They have to be repeated for each of the housings of the ring, and this increases the risk of discards and therefore the cost production of the polygonal ring.

There is therefore a need to propose a polygonal helical ring of a turbomachine with a lower production cost.

Also, in operation, the external bearing rings 15 are considerably stressed and wear quickly. In fact, under the effect of centrifugal loads the ring elongates in its tangential direction; as a result it undergoes fewer forces axially and therefore fewer axial deformations. Yet, the bearing rings are fretted both in zones subject to tangential deformations and axial deformations. As these deformations are different, they cause ovalisation of these rings, which is at the origin of friction and rapid wear for the rings.

PRESENTATION OF THE INVENTION

The aim of the invention is to remedy the problems associated with helical rings of the prior art.

It proposes in particular a helical ring structure which is simpler and less expensive to manufacture and minimises the risks of machining discards.

It also proposes a structure which minimises deformation of bearing pieces under the action of centrifugal forces and consequently limits wear on these pieces.

For this purpose, the invention proposes a hub for a radial housing of a helical ring of a turbomachine with variable-pitch blades, said ring being of the type comprising an annular rotor body and a plurality of radial housings distributed over said annular body around the central axis of the latter, characterised in that it is constituted by a piece separate from an annular body, intended to be received in a radial housing of the latter, the internal surface of said piece being adapted to receive a cylindrical blade support crown, as well as centring and/or guiding means for rotation of the latter, the hub also comprising two pins projecting relative to its external surface to connect it to the edges of a housing of the annular body, the two projecting pins forming a centring axis.

In particular, the internal surface of said hub advantageously comprises a machined area adapted to receive the bearing rings of a cylindrical blade support crown.

The invention also relates to an assembly for helical ring of a turbomachine with variable-pitch blades comprising an annular rotor body and a plurality of radial housings distributed over said annular body around the central axis of the latter, characterised in that it comprises a plurality of hubs comprising pieces separate from the annular body, said pieces being hubs of the above type, adapted to be received in the radial housings of said annular body.

DESCRIPTION OF THE FIGURES

Other characteristics, aims and advantages of the invention will emerge from the following description which is purely illustrative and non-limiting, and which must be considered relative to the attached drawings, in which.

DETAILED DESCRIPTION OF EMBODIMENTS AND EXECUTION OF THE INVENTION

Figure 4A:
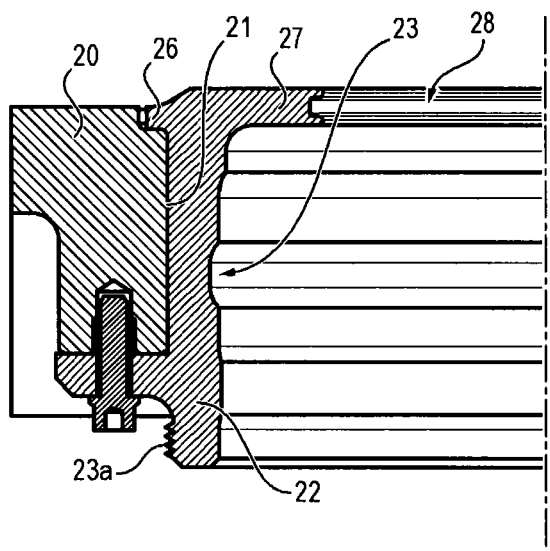
FIGS. 4a and 4b illustrate in section and in plan view a detail of a possible embodiment for an assembly forming a helical ring with a hub attached to a housing of a polygonal ring in keeping with a possible embodiment for the invention.
Figure 4B:
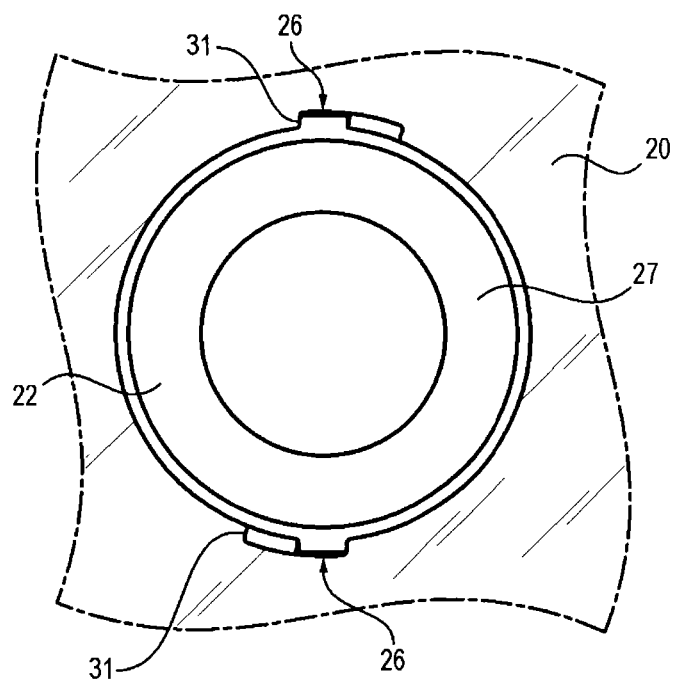

The assembly forming a helical ring illustrated in FIGS. 4a and 4b comprises a polygonal ring body 20 and a plurality of radial cylindrical housings 21, just one of these housings in this case having been shown in the figures.

It also comprises a plurality of hubs 22 which are pieces separate from the polygonal ring body 20, and which are received in the cylindrical radial housings 21.

Figure 3:
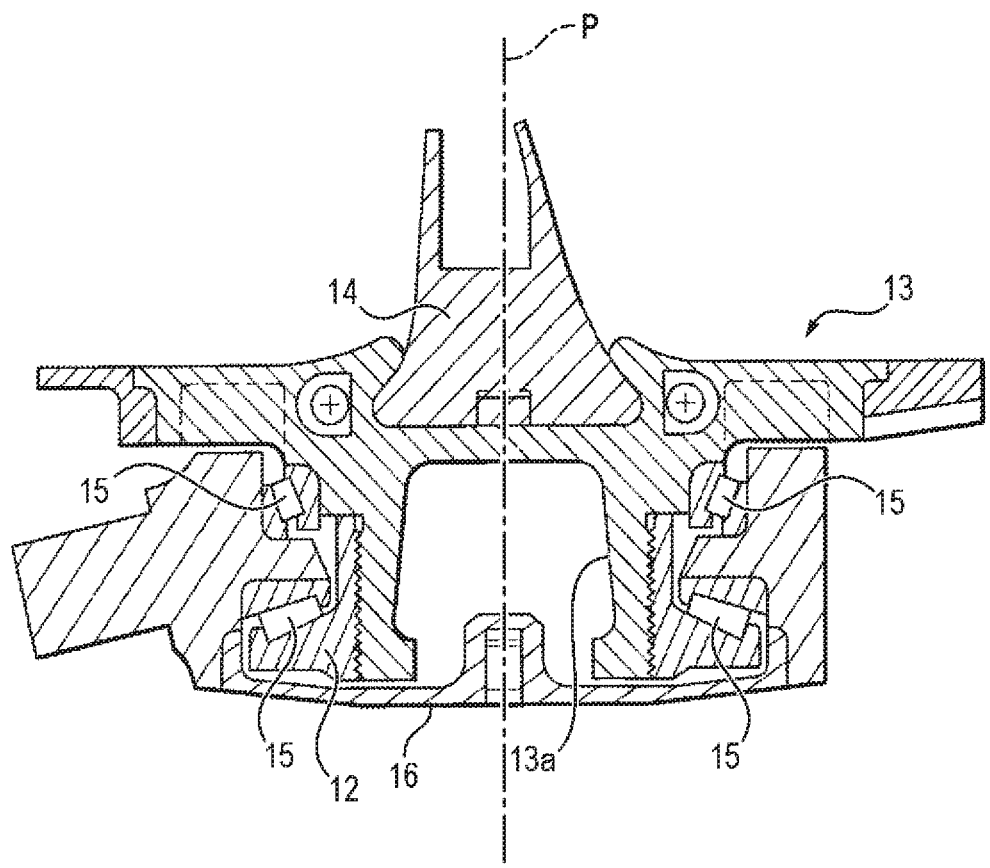
FIG. 3 is a representation in partial section of an open-rotor helix of the prior art.

On their inner surface these hubs 22 comprise machined areas 23 for mounting the bearing rings of rotating crown bearings identical to the crowns 12 of FIG. 3.

The machined areas 23 are for example annular grooving dimensioned to receive coaxial rings of bearing rings. They can more generally be of any type conventionally used to enable cylindrical housings to receive rotating crowns intended to receive helical blade plates, as well as the means for centring and guiding these crowns in rotation in their housing. An example of assembly in this sense could for example be found in application FR 2.943.312 (corresponding to U.S. Patent Publication No. 2010/239421 and U.S. Pat. No. 8,382,442).

The hubs 22 are also machined with the threads necessary for installing lids closing the housings for receiving crowns defined on these hubs (external thread 23a in FIG. 4a), as well as with threads for tightening any connecting nuts.

Because the different machined areas are arranged separately on the different hubs 22, the cost of any machining discard is limited to the relevant single hub and there is no need to repeat machining of the entire polygonal ring, as well as machining of the other different hubs 22.

Likewise, since the hubs 22 are not monobloc with the polygonal ring 20, centrifugal deformations of the ring 20 are not transmitted to the rings of the different bearings, which substantially limits wear of the latter.

In the example illustrated in FIGS. 4a, 4b and 5a to 5d, the hub 22 is fixed by interlocking in the housing 21 which receives it.

For this purpose, the housing 21 is principally defined by a cylinder whereof the inner surface 23 has two diametrically opposite guide grooves 24, extending in the height of said cylinder. These grooves 24 terminate on notches 25 which extend perpendicularly to these grooves 24 and are intended to receive complementary interlocking teeth 26 borne by the hub 22.

More precisely, the hub 22 has a general cylindrical shape complementary to that of the housing 21. At its end of the inner side of the polygonal ring, substantially at the height of a rim 27 ensuring a tight seal inside said hub 22 to receive the crown, it has two diametrically opposite interlocking teeth 26 which are projecting radially relative to the external wall of said hub 22.

At its other end, the hub 22 has, also projecting relative to the wall external of general cylindrical form of said 22, an annular stop 29 which is intended to be supported against the edges of the housing 21 on the polygonal ring. As a complement to the annular stops 31 which terminate the interlocking grooves 24, connections 30 of type screw/socket or the like ensure anti-rotation of the hub 22 in its housing 21.

Figure 5A:
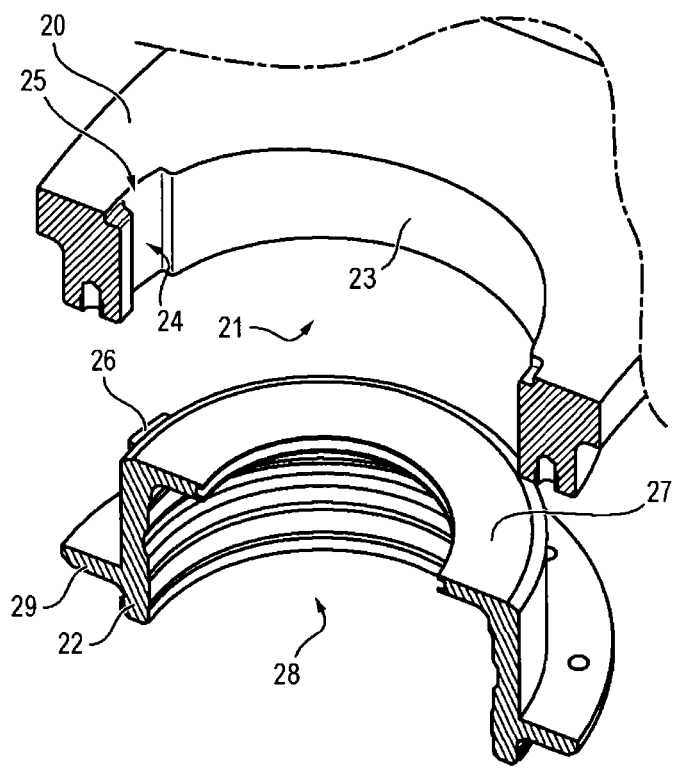
FIGS. 5a to 5d are schematic representations in exploded perspective illustrating different steps of the installing of an assembly as in FIGS. 4a to 4b.
Figure 5B:
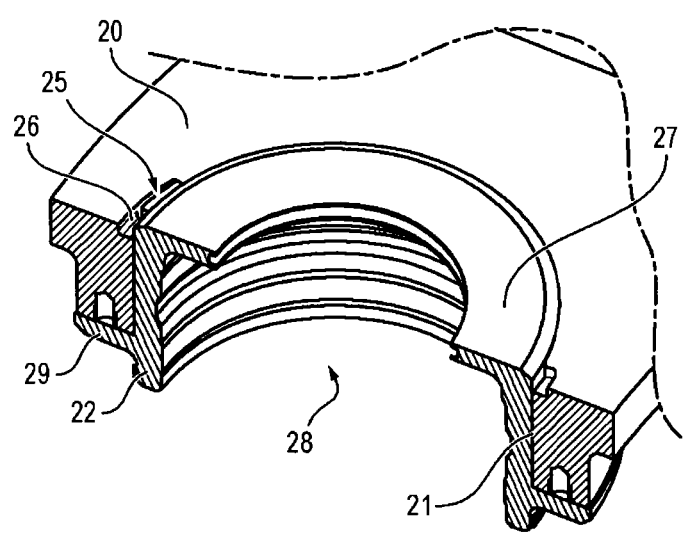
Figure 5C:
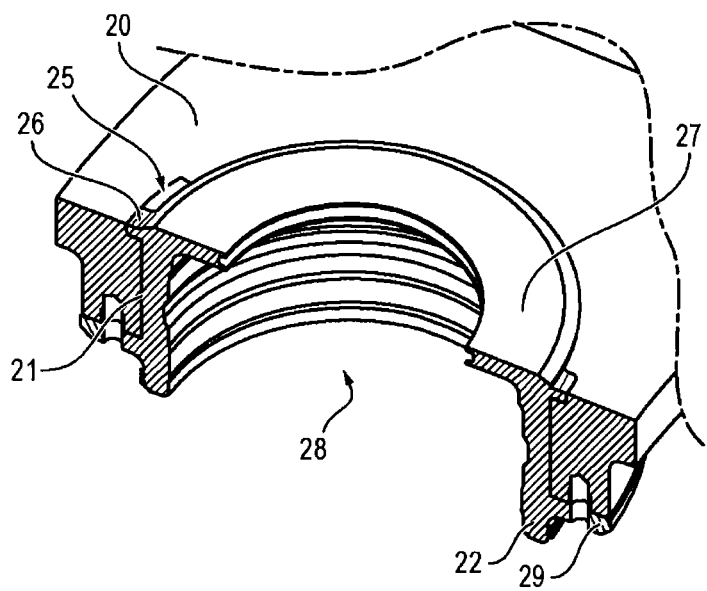
Figure 5D:
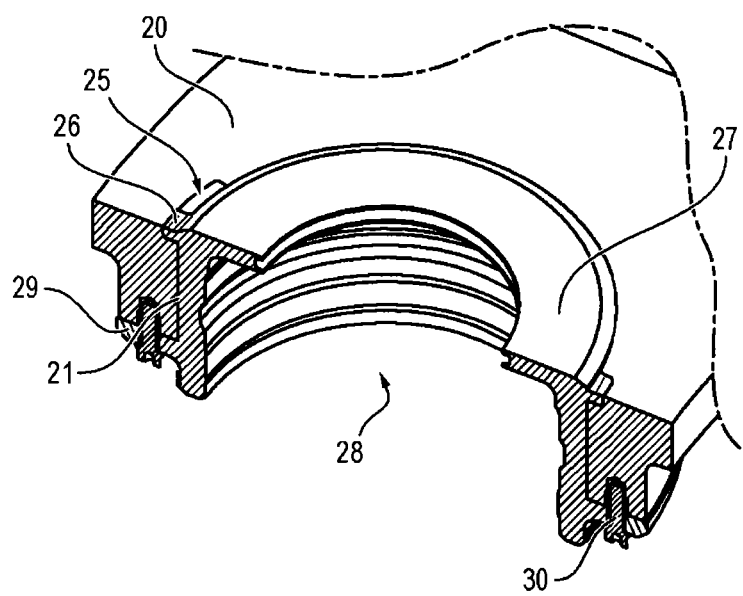

A hub 22 in a housing 21 is mounted as is illustrated in FIGS. 5a and 5d.

The hub 22 is shown centred on the housing 21 such that its projecting interlocking teeth 26 engage in the guide grooves 24 made in the height of the inner surface 23 of the housing 21 (FIG. 5a).

Once engaged, the hub 22 is remounted in the housing 21 until the annular stop 29 stops on the edge of the housing 21 (FIG. 5b).

The interlocking teeth 26, guided in the grooves 24, are now opposite the corresponding notches 25 and the hub 22 is now turned in the housing until the teeth stop on the annular stops 31. The hub 22 is now locked axially relative to the housing 21 (FIG. 5c).

Anti-rotation blocking screws 30 are then fitted and engaged in corresponding threads in the edge of the housing 22, through the annular stop 29.

Figure 6:
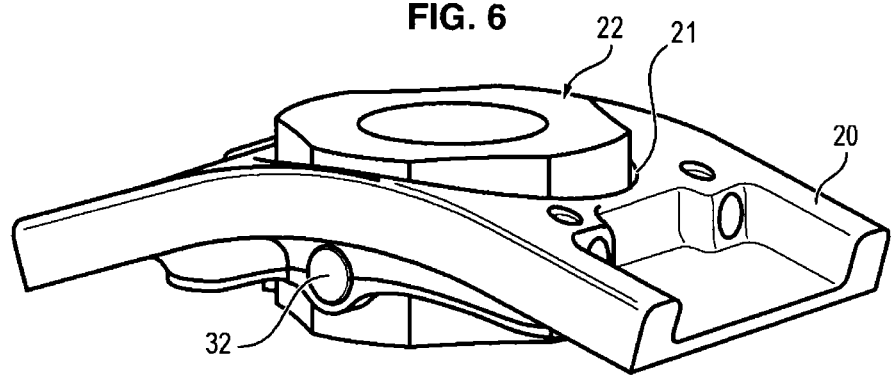
FIG. 6 is a representation in perspective illustrating another possible hub structure and another assembly.
Figure 7:
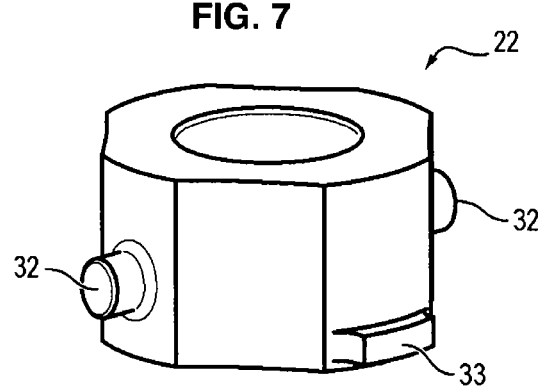
FIG. 7 illustrates in perspective the hub of the assembly of FIG. 6.
Figure 8:
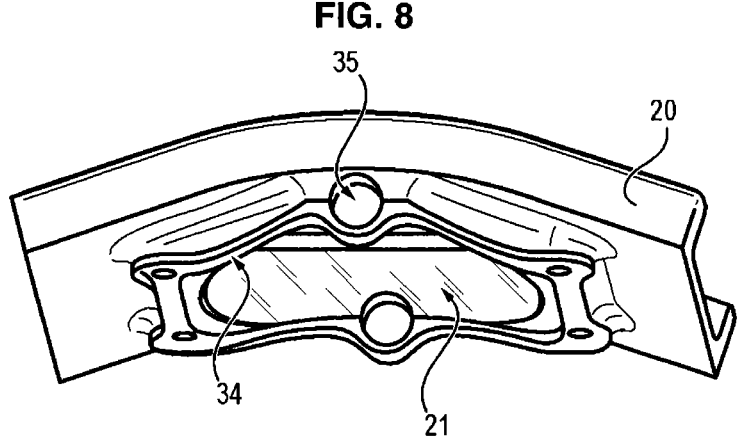
FIG. 8 illustrates in perspective the polygonal ring of the assembly of FIG. 6 and the means for connecting the hub associated with it.

As a variant illustrated in FIGS. 6 to 8, a hub 22 can be connected in a housing 21 by means of two centring pins 32 which extend and project relative to the hub 22, diametrically opposite. These two centring pins 32 are received on complementary U-shapes made on the edges of a housing 21, which define centring stirrups on the edges of the housing 21 for said pins 32.

Two diametrically opposite rims 33 extending perpendicularly relative to the axis of the hub 22 and the pins 31 can also be provided which are intended to be supported on the inner base of the ring 20.

A hood 34 is screwed on and with the U-shapes of the ring defines centring and connecting holes 35. This hood 34 keeps the assembly in place and also offers some dilation tangential clearance, especially between the edges of the housings 21 and the hubs 22.

In this way, the deformed shapes of the hubs and of the polygonal ring are separate.

Machining discards are also limited.

Figure 9:
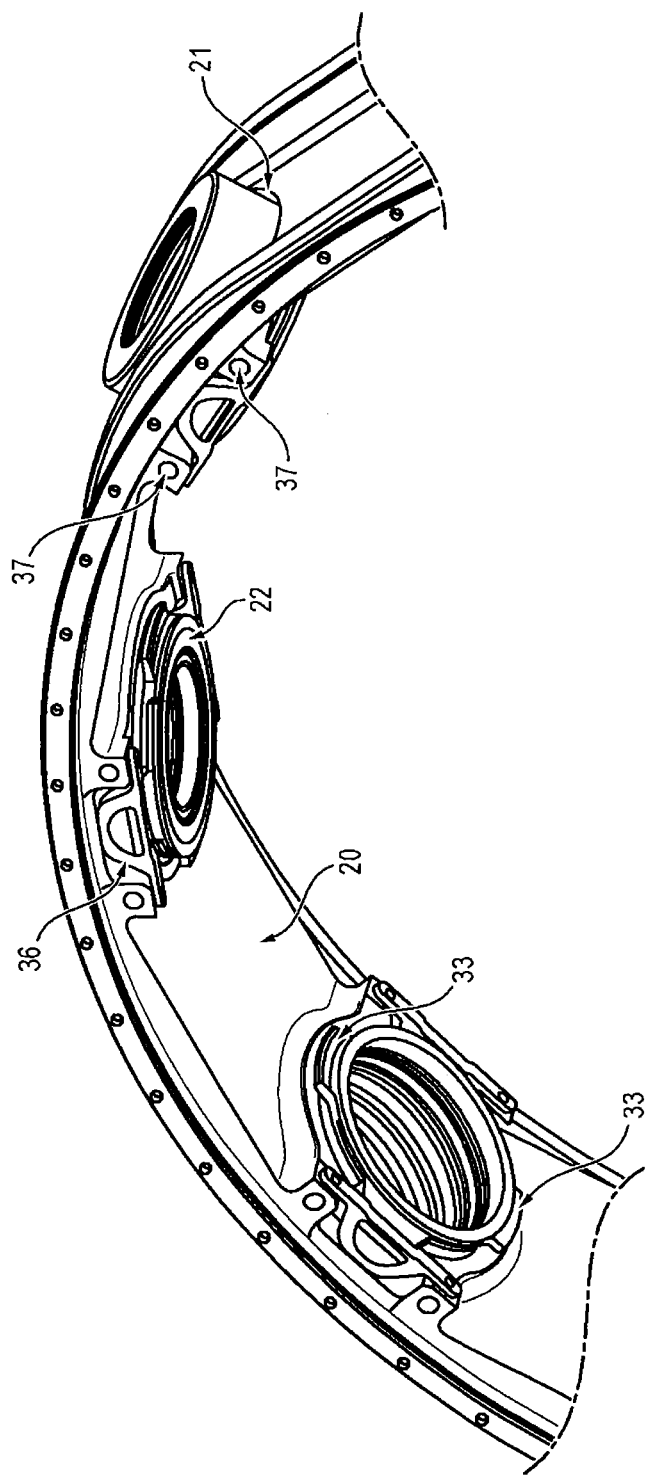
FIG. 9 illustrates a variant assembly of a polygonal ring with attached hub.

Another variant assembly illustrated in FIG. 9 proposes using separate pieces 36, forming detent forks, for connecting a hub 22 of the type comprising two centring pins 32 in a housing 21. The two centring pins 32 of a hub 22 are in this case received in the detent forks 36 (two per hub), in turn arranged diametrically on either side of the housing 21, and fixed, on the inner side of the polygonal body 20, by supporting their ends on projecting connecting stops 37. Elements forming dampers can be provided between the rims 33 of the hub and the polygonal body.

This variant omits the additional U-shaped machined areas of the centring holes 35 made on the polygonal body 20 of the preceding variant, and therefore further limits discards.

Figure 10:
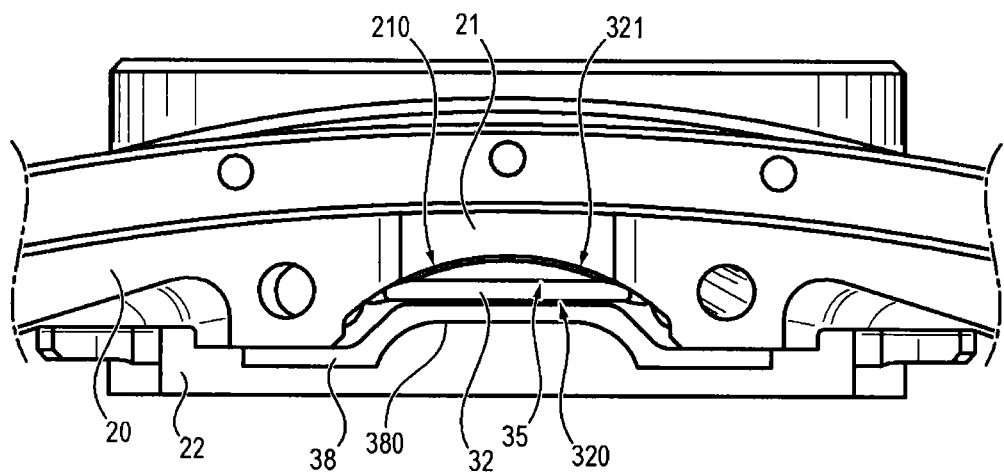
FIG. 10 illustrates another variant assembly of a polygonal ring with attached hub.

Another assembly variant is illustrated in FIG. 10. It repeats some elements of the assemblies of FIGS. 9 and 8.

In this variant, the centring pins 32 have a transversal cross-section similar to that of FIG. 9, comprising a rectilinear face 320 and an opposite curved face 321, the two faces forming for example a truncated circle. On the rims of each housing 21 at the level of its lower surface, the ring 20 has two opposite curved surfaces 210, each curved surface 210 forming the complement of the curved face of the centring pins 32, enabling the pins to be supported against this surface.

Also, two hood elements 38 are attached on either side of the housing on the lower surface of the ring 20 and with the curved surface 210 of the ring form centring and connecting holes 35 of complementary form to the cross-section of the pins 32. These hood elements are rods screwed onto the ring to keep the pins 32 supported against the housing and ensure that the hub is held in the ring.

In this respect and as evident in FIG. 10, the hood elements 38 have a rectilinear portion 380 supported against the rectilinear face 320 of the pins to keep them in place against the curved surface of the ring 20.

In this variant, the hub 22 also has rims 33 forming a stop when the hub is inserted into the housing 21 of the ring 20.

The assemblies which have just been described are used advantageously for open-rotor helices for a turbomachine with variable-pitch blades. The blades are mounted conventionally (cf. description already given in reference to FIGS.

Figure 1:
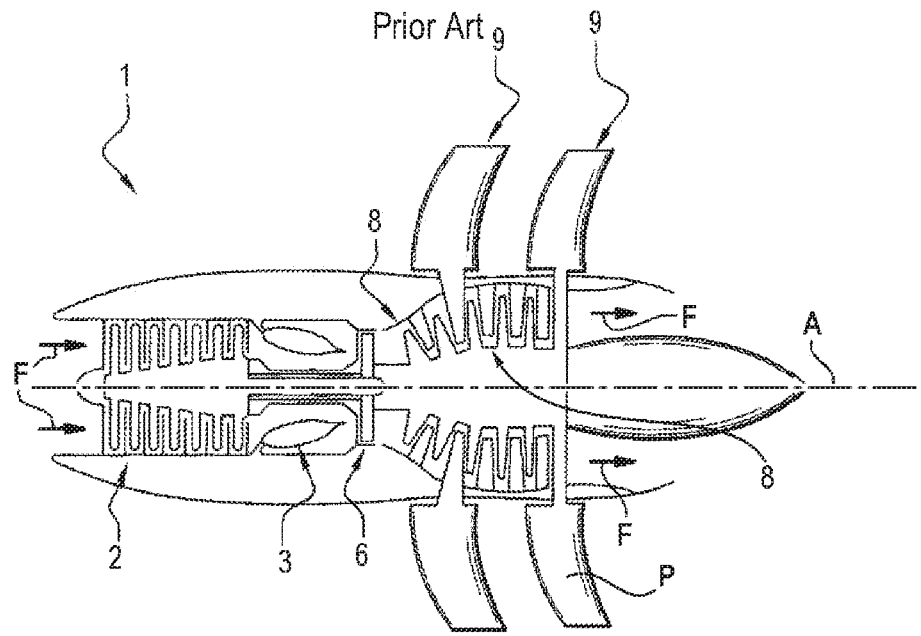
FIG. 1 is a schematic general representation of a turbomachine of open-rotor helix type.
Figure 2:
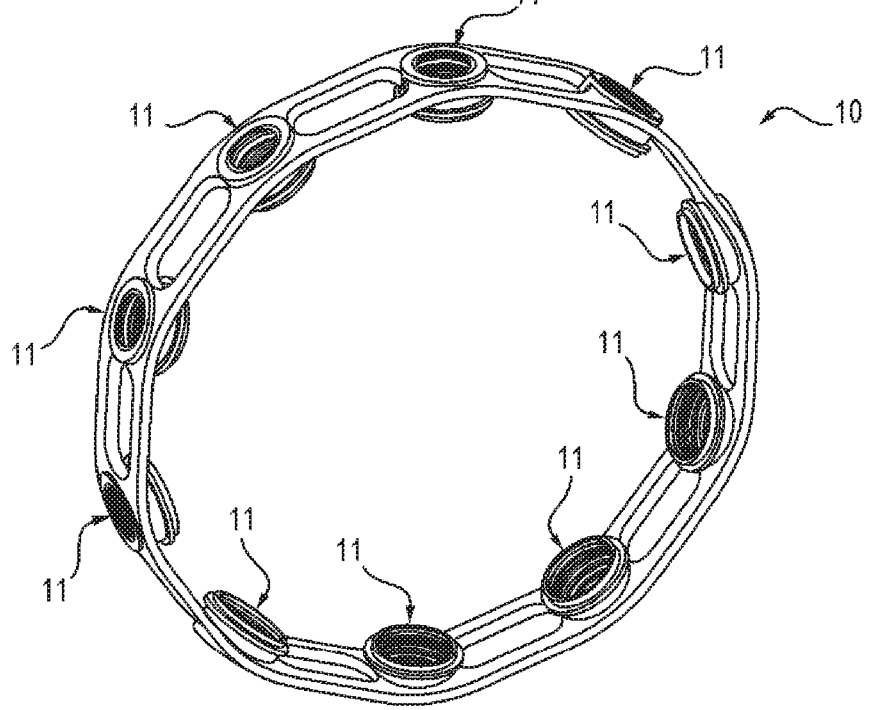
FIG. 2 schematically illustrates a polygonal ring structure known from the prior art.

1 to 3) on such an assembly forming a helical ring, changing the fact only that the hubs are pieces separable from the annular rotor body. In principle the turbomachine is similar to that illustrated in FIG. 1.

The invention claimed is:

1. A hub for a radial housing of a helical ring of a turbomachine with variable-pitch blades, said ring comprising an annular rotor body and a plurality of radial housings distributed over said annular rotor body around a central axis, said hub comprising:
   a piece separate from the annular rotor body, configured to be received in the radial housing of the annular rotor body, an internal surface of said piece being adapted to receive a cylindrical blade support crown and at least one of centering or guiding means for rotation of the cylindrical blade support crown; and
   two pins projecting relative to an external surface of the hub to fasten said external surface to edges of the radial housing of the annular rotor body, the two projecting pins forming a centering axis,
   wherein said internal surface comprises a machined area adapted to receive bearing rings of the cylindrical blade support crown, and
   wherein the hub further comprises two rims adapted to be supported on the edges of the radial housing when the pins are in place on the edges of the radial housing.

2. An assembly for the helical ring of the turbomachine with the variable-pitch blades comprising the annular rotor body and the plurality of radial housings distributed over said annular rotor body around the central axis, said assembly comprising a plurality of hubs constituted by pieces separate from the annular rotor body, said pieces being hubs according to claim 1 adapted to be received in the radial housings of said annular rotor body,
   wherein edges of one of the radial housings have U-shapes forming a stirrup for the pins of the hub and defining centering holes for said pins with a blocking hood attached to said one of the radial housings.

3. An assembly according to claim 2, further comprising detent forks comprising pieces separate from the annular rotor body and the hub, said forks forming a stirrup for the pins of the hub and being fixed to an internal wall of said annular rotor body.

4. An assembly according to claim 2, wherein the pins have a curved surface and a rectilinear surface opposite said curved surface, wherein an edge of each housing of the annular rotor body has curved surfaces adapted to receive a respective pin of the hub, and further comprising hood elements, comprising pieces separate from the annular rotor body and the hub, said hood elements comprising a rectilinear portion adapted to keep the pins supported against the curved surfaces.

5. An open-rotor helix for the turbomachine with the variable-pitch blades comprising the assembly according to claim 2, and a plurality of blades mounted on said assembly.

6. A turbomachine comprising:
   a helical ring comprising an annular rotor body and a plurality of radial housings distributed over said annular rotor body around a central axis,
   a plurality of variable-pitch blades; and
   a hub for each of the radial housings, said hub comprising:
      a piece separate from the annular rotor body, configured to be received in the radial housing of the annular rotor body, an internal surface of said piece being adapted to receive a cylindrical blade support crown and at least one of centering or guiding means for rotation of the cylindrical blade support crown, and
      two pins projecting relative to an external surface of the hub to fasten said external surface to edges of the radial housing, the two projecting pins forming a centering axis,
   wherein said internal surface comprises a machined area adapted to receive bearing rings of the cylindrical blade support crown, and
   wherein the hub further comprises two rims adapted to be supported on the edges of the radial housing when the pins are in place on the edges of the radial housing.

* * * * *